S. JOHNSON.
WEED CUTTER.
APPLICATION FILED APR. 19, 1915.
1,201,589.
Patented Oct. 17, 1916.
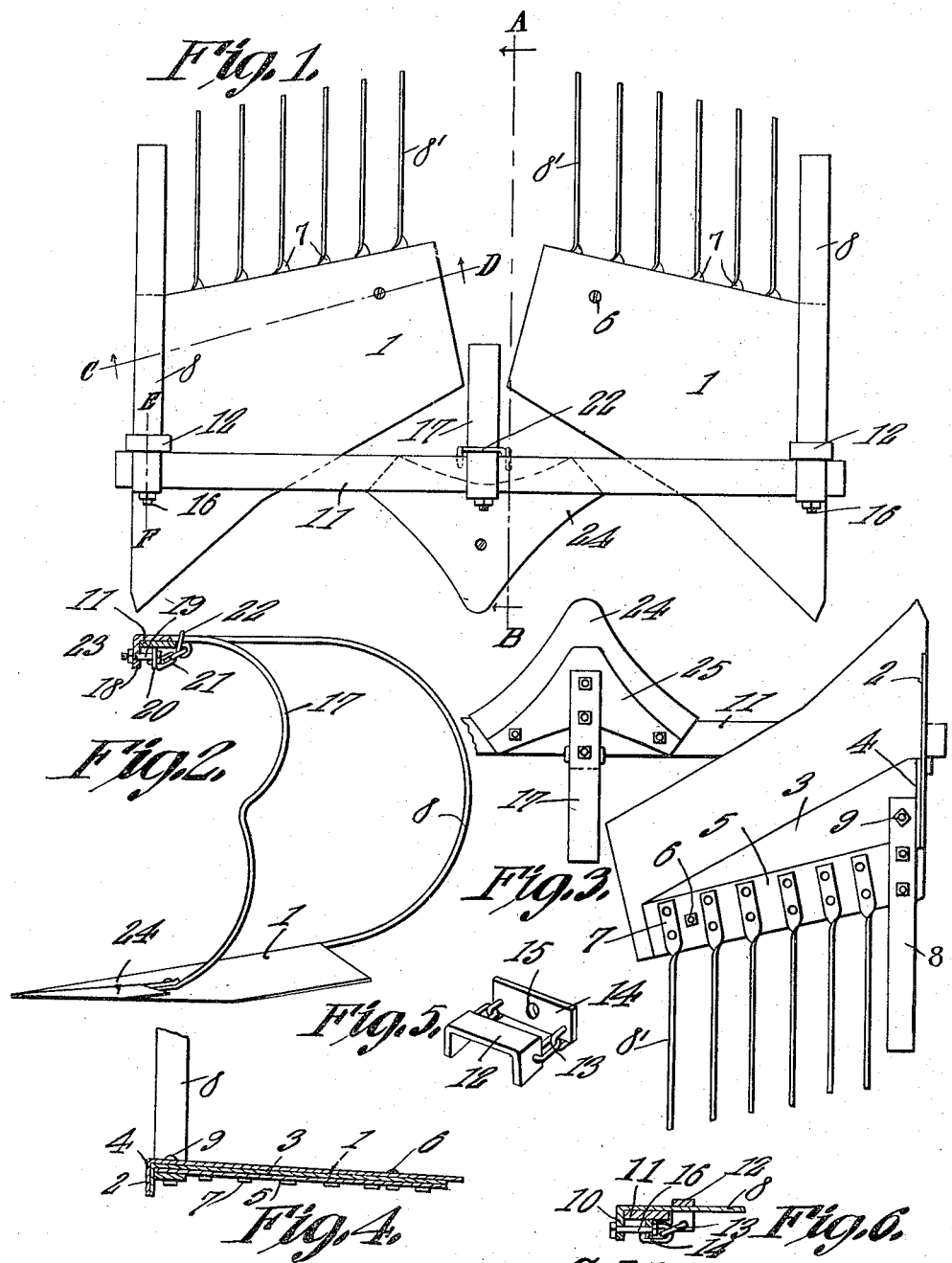
Witnesses
J. R. Temley
R. L. Parker.
S. Johnson,
Inventor
by C. A. Snow & Co.
Attorneys

UNITED STATES PATENT OFFICE.

SAMUEL JOHNSON, OF TOOELE, UTAH.

WEED-CUTTER.

1,201,589.

Specification of Letters Patent.

Patented Oct. 17, 1916.

Application filed April 19, 1915. Serial No. 22,426.

*To all whom it may concern:*

Be it known that I, SAMUEL JOHNSON, a citizen of the United States, residing at Tooele, in the county of Tooele and State of Utah, have invented a new and useful Weed-Cutter, of which the following is a specification.

This invention relates to weed cutters and more particularly to a device of this character adapted to be connected to the back end of a harrow or cultivator so as to remove any weeds that may be left after the harrow or cultivator has passed over the ground.

One of the objects of the invention is to provide a cutter, the soil engaging portions of which are so constructed and arranged as to completely cover the space passed over by the harrow or cultivator, there being means for pulverizing the soil after the weeds have been cut.

A further object is to provide a structure of this character the parts of which are readily adjustable toward or from each other.

Another object is to provide a weed cutter which is simple, durable and inexpensive in construction and which can be applied readily to a cultivator or harrow.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the weed cutter. Fig. 2 is a section on line A—B Fig. 1. Fig. 3 is a bottom plan view of a portion of the weed cutter. Fig. 4 is a section on line C—D Fig. 1. Fig. 5 is a detail view of one of the clips used for holding the parts together. Fig. 6 is a section on line E—F Fig. 1.

Referring to the figures by characters of reference 1 designates a cutting blade or shear which can be of any size and shape desired, the outer edge thereof being provided with a downturned flange 2 constituting a runner. The front or cutting edge of the blade is preferably extended forwardly and outwardly from the inner end thereof and thus it will be seen that where two of these blades 1 are used, it will be necessary to employ opposites, one being a right hand blade and the other a left hand blade. This will be apparent by referring to Fig. 1. Arranged under each of the blades 1 is a reinforcing plate 3 extending from the rear edge of the blade forwardly to a point adjacent the longitudinal center thereof, this plate being also provided with a downturned flange 4 fitting snugly against the inner side of the flange 2. Extending along the bottom of each reinforcing plate 3 at the back thereof is an attaching plate 5, this attaching plate and the reinforcing plate being secured to the blade 1 by means of bolts 6 or the like. Secured to the attaching plate 5 is a series of strips 7 which extend rearwardly beyond the blade 1 to form fingers 8', those portions of the strips constituting the fingers being disposed preferably in planes at right angles to the forward portions of the strips 7, this result being secured by giving each strip a one-quarter turn or twist.

Extending under the outer side portion of each blade 1 is the lower end of a bowed shank 8 preferably formed of heavy spring metal, said shank being bolted or otherwise secured to the strip 5, plate 3 and blade 1, as indicated at 9. The upper portion of the shank is curved forwardly and is preferably provided with a downwardly extending lip 10 adapted to lap the forward edge of a cross beam 11. For the purpose of attaching the shank 8 to this cross beam, a yoke 12 is preferably provided, this yoke being placed astride the shank 8 and against the rear edge of the strip 11. Links 13 connect the sides of the yoke to a plate 14 located under shank 8 and strip 11. This plate 14 is formed with an opening 15 adapted to receive a bolt 16 adjustably mounted in lip 10. Thus by turning the bolt in one direction, the plate 14 will be drawn toward the lip 10, thereby pulling through links 13 upon the yoke 12 and causing said yoke to bind the shank 8 and the strip 11 together securely. Connected to an intermediate portion of the strip 11 is a shank 17 likewise provided at its upper end with a depending lip 18 slidably engaged by a bolt 19 which extends through a plate 20. This plate is connected by links 21 to a yoke 22 straddling the upper portion of the shank 17 so that, when the bolt 19 is tightened by means of a nut 23 or the like, the shank 17 will be firmly secured to the cross strip 11. Shank 17 preferably does not extend backwardly in the same manner as do the shanks 8. Instead it curves abruptly downwardly forming a double bow, the lower end of the shank being extended under a substantially V-shaped blade 24 having a correspondingly shaped reinforcing plate 25 thereunder. This cutting blade 24 is located in front of the inner ends of the blades 1 so as thus to engage that portion of the soil which might otherwise be left untouched by the blades 1.

It is to be understood that the shanks 8 and 17 can be adjusted toward or from each other along the strip 11 so as to bring the blades 1 and 24 to any desired positions relative to each other. In using the device it is connected by any suitable means to the rear portion of a harrow or cultivator so as to travel along the ground directly behind the same. The means employed for attaching the weeder can be varied at will and it is not deemed necessary, therefore, to describe or show any of these structures in detail.

As the weeder is drawn forward the blades 1 and 24 cut under the surface of the soil and operate to remove any weeds that may be left standing by the cultivator or harrow to which the weeder is attached.

The soil passing over the blade 24 will be caught up by the blades 1 and the soil passing over the blades 1 will be pulverized by the rearwardly extending fingers 8'.

What is claimed is:—

A weeding attachment for harrows and the like, including a cutting blade, a downturned flange along the outer side of the blade and constituting a runner, the cutting edge of the blade being diagonally disposed to form an acute angle with the runner, a reinforcing plate extending from the rear edge of the blade forwardly to a portion adjacent the center thereof, a downturned flange upon the reinforcing plate and fitted snugly against the inner side of the flange on the cutting blade, an attaching plate extending under the reinforcing plate and throughout the width thereof, and a series of strips secured to the attaching plate and extending rearwardly therefrom, said strips being each provided with a one-quarter twist whereby the broad faces of the strips are maintained in a substantially vertical plane, said strips forming parallel fingers.

In testimony that I claim the foregoing as my own, I have hereto affixed my signature in the presence of two witnesses.

SAMUEL JOHNSON.

Witnesses:
 JOHN B. GORDON,
 C. IVER RJAX.

Copies of this patent may be obtained for five cents each, by addressing the "Commissioner of Patents, Washington, D. C."